United States Patent
Smith et al.

(10) Patent No.: US 11,726,385 B2
(45) Date of Patent: Aug. 15, 2023

(54) OPTICAL SOURCE AND SUPERCONTINUUM LIGHT GENERATION APPARATUS

(71) Applicant: NKT PHOTONICS A/S, Birkerød (DK)

(72) Inventors: Cameron Lesley Colwell Smith, Copenhagen (DK); Alexandra Lupi, Frederiksberg (DK); Martin Erland Vestergaard Pedersen, Allerød (DK); Jens Kristian Lyngsø, Hornbæk (DK); Martin D. Maack, Kgs. Lyngby (DK)

(73) Assignee: NKT PHOTONICS A/S, Birkerod (DK)

( * ) Notice: Subject to any disclaimer, the term of this patent is extended or adjusted under 35 U.S.C. 154(b) by 0 days.

(21) Appl. No.: 17/921,494

(22) PCT Filed: Apr. 27, 2021

(86) PCT No.: PCT/EP2021/060912
§ 371 (c)(1),
(2) Date: Oct. 26, 2022

(87) PCT Pub. No.: WO2021/219592
PCT Pub. Date: Nov. 4, 2021

(65) Prior Publication Data
US 2023/0092715 A1    Mar. 23, 2023

(30) Foreign Application Priority Data
Apr. 27, 2020  (EP) .................................... 20171612

(51) Int. Cl.
*G02F 1/35*       (2006.01)
*G02F 1/365*      (2006.01)

(52) U.S. Cl.
CPC .......... *G02F 1/3528* (2021.01); *G02F 1/3503* (2021.01); *G02F 1/365* (2013.01); *G02F 2202/32* (2013.01)

(58) Field of Classification Search
None
See application file for complete search history.

(56) References Cited

U.S. PATENT DOCUMENTS 7,212,717 B2 *   5/2007   Saito .................. G02B 6/02357
                                                    385/125
8,718,104 B2 *   5/2014   Clowes ................. H01S 3/2308
                                                    372/6

(Continued)

OTHER PUBLICATIONS

J. Broeng et al., "Photonic crystal fibres in the market," 16th Opto-Electronics and Communications Conference, Kaohsiung, Taiwan, 2011, pp. 53-54. (Year: 2011).*

(Continued)

*Primary Examiner* — Rhonda S Peace
(74) *Attorney, Agent, or Firm* — Buchanan Ingersoll & Rooney PC

(57) ABSTRACT

An optical source including a supercontinuum generation apparatus including a pump light source, a twisted photonic crystal fibre, PCF, and a wideband quarter-wave retarder. The pump light source is arranged to provide circularly polarised pump light. The twisted PCF is arranged to receive the pump light and to convert the pump light into circularly polarised supercontinuum light. The wideband quarter-wave retarder is arranged to convert the circularly polarised supercontinuum light into linearly polarised supercontinuum light. The optical source may additionally include a wavelength tunable bandpass optical filter arranged to transmit the linearly polarised supercontinuum light at wavelengths within a selected range.

11 Claims, 4 Drawing Sheets

(56) References Cited

U.S. PATENT DOCUMENTS

| | | | |
|---|---|---|---|
| 9,645,470 B2* | 5/2017 | Liu | G02F 1/383 |
| 9,971,229 B2* | 5/2018 | Kung | G02F 1/3511 |
| 10,228,510 B2* | 3/2019 | Alkeskjold | G02B 6/02357 |
| 2016/0327736 A1* | 11/2016 | Holdynski | G02B 6/02314 |
| 2017/0082909 A1 | 3/2017 | Kung et al. | |

OTHER PUBLICATIONS

Qin, Guanshi, et al. "Flat supercontinuum generation in a microstructure tellurite fiber." LEOS 2008-21st Annual Meeting of the IEEE Lasers and Electro-Optics Society. IEEE, 2008. (Year: 2008).*

Gupta, Pranjol Sen, and Mohammad Faisal. "Microstructure fiber with extremely high nonlinearity for supercontinuum generation." 2017 IEEE International Conference on Telecommunications and Photonics (ICTP). IEEE, 2017. (Year: 2017).*

Extended European Search Report dated Oct. 19, 2020 issued by the European Patent Office in corresponding European Patent Application No. 20171612.3. (6 pages).

International Search Report (PCT/ISA/210) and Written Opinion (PCT/ISA/237) dated Aug. 4, 2021, by the European Patent Office as the International Searching Authority for International Application No. PCT/EP2021/060912. (13 pages).

Tao, Yue, et al., "All-fiber high-power linearly polarized supercontinuum generation from polarization-maintaining photonic crystal fibers", High Power Laser Science and Engineering, Apr. 26, 2019, pp. 1-6, vol. 7, issue 28. (6 pages).

Wong, G.K.L., et al., "Optical properties of helically twisted solid-core photonic crystal fibre" Asia Communications and Photonics Conference (ACP), OSA, Nov. 11, 2014, p. 1. (1 page).

\* cited by examiner

OPTICAL SOURCE AND SUPERCONTINUUM LIGHT GENERATION APPARATUS

TECHNICAL FIELD

The invention relates to an optical source and to supercontinuum light generation apparatus.

BACKGROUND

The standard practice to date to produce stable, linearly polarised supercontinuum light has been to generate unpolarized supercontinuum light in a photonic crystal fibre, PCF, and to use a polarisation filter to discard the unwanted polarisation state. This results in a loss of approximately 50% of the generated supercontinuum light. By requiring the supercontinuum source to produce approximately double the light output that is ultimately used, such systems experience a lifetime limitation. This lifetime limitation stems from photoinduced photodarkening in the PCF which develops at a rate that increases nonlinearly with output power. Generating linearly polarised supercontinuum light in a PCF would mitigate the problem of photoinduced photodarkening lifetime limitation, since the supercontinuum light could be generated at lower optical powers. However, the generation of long-term stable linearly polarised supercontinuum light is challenging to achieve due to the instability of polarisation maintaining properties in PCFs.

SUMMARY

It is an object to provide an improved optical source. It is a further object to provide an improved supercontinuum light generation apparatus.

An aspect of the invention provides a supercontinuum light generation apparatus comprising a pump light source, a twisted photonic crystal fibre, PCF, and a wideband quarter-wave retarder. The pump light source is arranged to provide circularly polarised pump light. The twisted PCF is arranged to receive the pump light from the pump light source and to convert the pump light into circularly polarised supercontinuum light. The wideband quarter-wave retarder is arranged to convert the circularly polarised supercontinuum light into linearly polarised supercontinuum light. The supercontinuum light generation apparatus advantageously generates linearly polarized supercontinuum light by converting circularly polarised supercontinuum light into linearly polarised supercontinuum light, thus avoiding the need for a polarisation filter after the PCF. This means that, to output linearly polarized supercontinuum light having a specified output spectral power density, the optical source only needs to generate around half the supercontinuum light optical power in the twisted PCF than would need to be generated in a PCF in the known systems. As a result, the lifetime of the components of the optical source, in particular the twisted PCF, may be dramatically extended as compared to the components, in particular the PCF, of prior art systems for generating linearly polarized supercontinuum light.

In an embodiment, the wideband quarter-wave retarder is a Fresnel rhomb.

In an embodiment, the twisted PCF is a solid core twisted PCF.

In an embodiment, the twisted PCF has a twist rate greater than 1 rad/cm, greater than 10 rad/cm or greater than 100 rad/cm.

In an embodiment, the optical source comprises a supercontinuum light generation apparatus according to one of the embodiments and an optical filter arranged to transmit the linearly polarised supercontinuum light at wavelengths within a selected wavelength range. This advantageously enables the optical source to output a selected bandwidth of linearly polarised light.

In an embodiment, the optical filter comprises one or more of a wavelength tunable bandpass optical filter, a short-pass filter, a long-pass filter and a notch filter.

In an embodiment, the apparatus further comprises a wavelength tunable bandpass optical filter arranged to transmit the linearly polarised supercontinuum light at wavelengths within a selected range. This advantageously enables the apparatus to output a narrow bandwidth of linearly polarised light, tunable across a broad wavelength range.

In an embodiment, the wavelength tunable bandpass optical filter is an acousto-optic tunable filter, AOTF. This advantageously enables the optical source to output a narrow, continuously tunable bandwidth of linearly polarised light. Use of an AOTF is advantageously enabled as a result of the supercontinuum light input into it being linearly polarised supercontinuum light. AOTFs are in general polarization dependent and only suppress light in one linear polarization. A single AOTF may be used since linearly polarised supercontinuum light of a single polarisation is output from the wideband quarter-wave retarder. Therefore, prior art systems need to completely block the other polarization before or after the AOTF thereby loosing 50% of the light. Use of an AOTF, or other polarization-dependent filters, for effective spectral filtering of the received supercontinuum is advantageously enabled without the need of discarding one polarization completely as a result of the supercontinuum light input into it being linearly polarised supercontinuum light. While the prior art systems introduce a 50% loss within the transmission band of the AOTF, the disclosed system ensures that the supercontinuum received by the AOTF is linear polarized such that there is no need for completely discarding the polarisation which is not affected by the AOTF.

In an embodiment, the pump light source is arranged to provide circularly polarised pump light pulses.

Embodiments of the invention will now be described, by way of example only, with reference to the accompanying drawings.

DETAILED DESCRIPTION

The same reference numbers will used for corresponding features in different embodiments.

Figure 1:
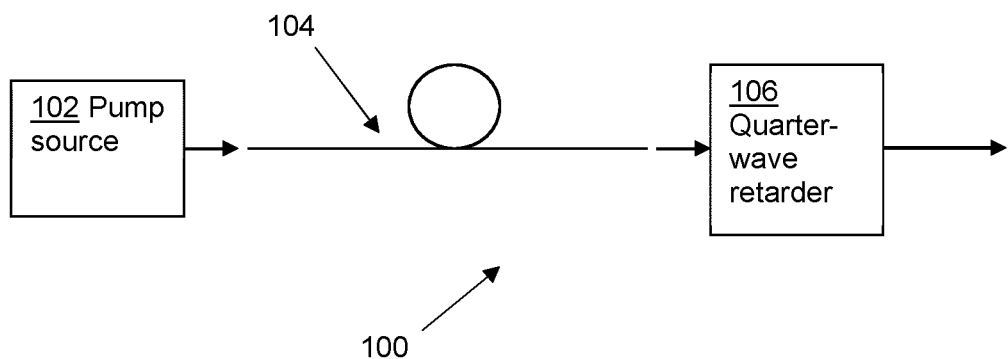
FIGS. 1 to 4 are block diagrams illustrating embodiments of an optical source.

Referring to FIG. 1, an embodiment provides an optical source 100 comprising a supercontinuum light generation apparatus and a wideband quarter-wave retarder 106. The supercontinuum light generation apparatus comprising a pump light source 102 and a twisted photonic crystal fibre, PCF, 104.

The pump light source is arranged to provide circularly polarised pump light. The twisted PCF is arranged to receive the circularly polarised pump light from the pump light source and to convert it into circularly polarised supercontinuum light.

The wideband quarter-wave retarder is arranged to convert the circularly polarised supercontinuum light into linearly polarised supercontinuum light and has an operating bandwidth that covers at least a portion of the supercontinuum spectrum, such as a wavelength range from 400 nm to 1550 nm. The wideband quarter-wave retarder is configured to introduce a 90° phase shift in one of the two perpendicular polarization components of the received circularly polarized light, thereby bringing the two polarization components into phase, in a chosen linear polarisation state.

Whereas the polarisation filter of the standard practice implementation for generating linearly polarized supercontinuum light discards light having the unwanted linear polarisation state, the wideband quarter-wave retarder advantageously converts the component of the circularly polarised supercontinuum light having the unwanted linear polarisation state into the wanted linear polarization state. The full optical power of the generated supercontinuum light may therefore be preserved.

Figure 2:
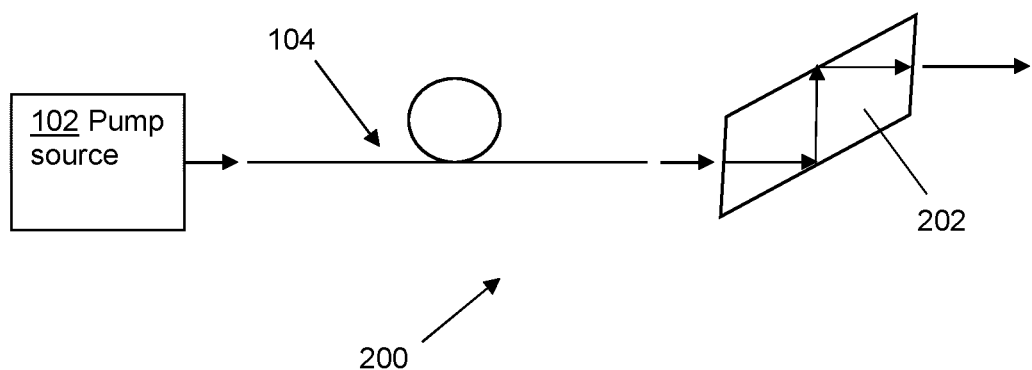

Referring to FIG. 2, an embodiment provides an optical source 200 comprising a supercontinuum light generation apparatus and a wideband quarter-wave retarder 202. The supercontinuum light generation apparatus comprising a pump light source 102 and a twisted photonic crystal fibre, PCF, 104.

The wideband quarter-wave retarder is a Fresnel rhomb 202 optical prism. The Fresnel rhomb advantageously has an operating bandwidth that encompasses a wide bandwidth within the spectrum of the circularly polarized supercontinuum light, so that a wide band of wavelengths within the supercontinuum spectrum are converted from circular to linear polarization. The operating bandwidth of the Fresnel rhomb includes the visible wavelength spectrum (about 380 nm-700 nm). For example, the Fresnel rhomb may have an operating bandwidth of 400 nm-1550 nm.

The Fresnel rhomb is arranged such that the received circularly polarized light undergoes two total internal reflections on transmission through the Fresnel rhomb. The Fresnel rhomb is configured such that each reflection introduces a 45° phase shift in one of the two perpendicular polarization components of the received circularly polarized light. Transmission through the Fresnel rhomb therefore introduces a 90° phase shift in the selected polarization component, thereby bringing the two polarization components into phase so that the output supercontinuum light is linearly polarized at 45° to the plane of incidence and reflection of the light within the Fresnel rhomb.

The pump light source may, for example, be arranged to generate circularly polarised pump light in the Ytterbium gain band, for example around 1000 nm, such as around 1064 nm.

In an embodiment, the pump light source is arranged to provide circularly polarised pump light pulses. The pump light source may be configured to generate short optical pulses. For example, the pump light source may be configured to generate optical pulses having a full width at half maximum, FWHM, duration of less than 100 ns, less than 10 ns, less than 1 ns, less than 100 ps, less than 10 ps, less than 1 ps, less than 500 fs or less than 100 fs.

The pump light source may include a seed source and one or more optical amplifiers. The seed source may comprise an oscillator, such as a gain switched diode or a modelocked fibre laser, configured to generate seed pulses. The seed pulses output from the seed source are amplified by the one or more optical amplifiers, which may include an amplifier chain including a pre-amplifier and one or more further amplifiers. Suitable pump light sources for providing pump light having power, wavelength, pulse duration, and repetition rate characteristics suitable for supercontinuum generation in PCFs are known per se, as described, for example in EP2081074B1.

The pump light source may be configured to generate a pulse train of pump light pulses, the pulse train may be generated with a repetition rate of greater than 10 KHz, greater than 100 KHz, greater than 1 MHz, greater than 10 MHz, greater than 20 MHz, greater than 50 MHz, or greater than 100 MHz.

The pump light source may be configured to produce pump light pulses having an average power of greater than 1 mW, greater than 10 mW, greater than 100 mW, greater than 1 W, greater than 2 W, greater than 5 W, greater than 10 W, greater than 20 W, or greater than 50 W.

In an embodiment, the twisted PCF 104 is a solid core twisted PCF.

The twisted PCF 104 includes a core region and a cladding region. The core region may be substantially circular and may for example have a core diameter of less than 10 μm, less than 5 μm, less than 4 μm, less than 3 μm, or less than 2 μm. The cladding region includes longitudinally extending features, such as air holes, disposed about the cladding region. The features have an index of refraction that is different than that of the material surrounding the features. The features facilitate light guidance via one or more mechanisms, such as, for example, index guidance or via the creation of a photonic bandgap.

As will be understood the person skilled in the art, the longitudinally extending features in the cladding region may give rise to an "effective refractive index" of the cladding region, defined for the fundamental space filling mode. The difference between the refractive index of the core region and the effective refractive index of the cladding region may be less than $10^{-4}$, or less than $10^{-5}$. The solid areas of a PCF may be formed of doped or undoped silica.

The twist rate of the twisted PCF 104, which describes the helicoidal round trip of the longitudinal holes about the PCF core, may be greater than 1 rad/cm, greater than 10 rad/cm or greater than 100 rad/cm.

Figure 3:
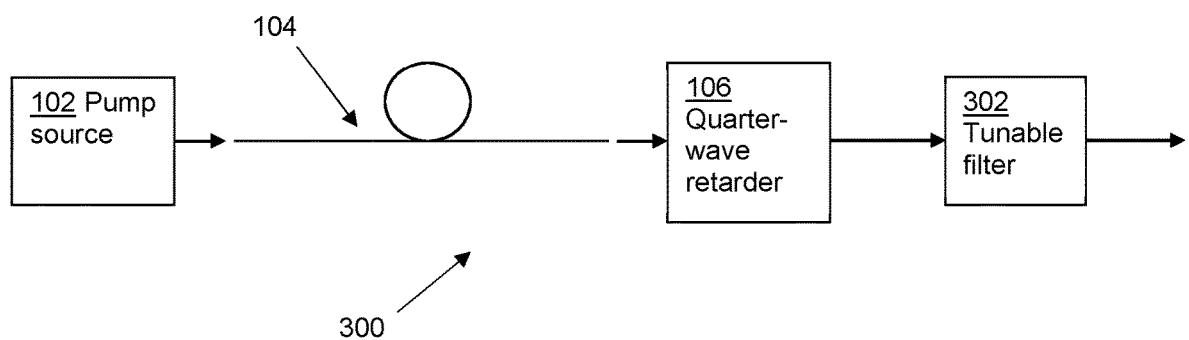

In an embodiment, shown in FIG. 3, the optical source 300 further comprises an optical filter, in the form of a wavelength tunable bandpass optical filter 302. The wavelength tunable bandpass optical filter 302 is arranged to transmit the linearly polarised supercontinuum light at wavelengths within a selected range. The pass band of the filter 302 is tunable across a wide bandwidth within the supercontinuum spectrum. The optical source 300 is therefore configurable to output linearly polarized light at selected bands of wavelengths within its operating bandwidth within the supercontinuum spectrum.

In an embodiment, the optical filter comprises a short-pass filter. The short-pass filter may, for example, be configured only to transmit light at wavelengths within the visible part of the supercontinuum spectrum, thereby avoiding all non-visible light.

In an embodiment, the optical filter comprises a long-pass filter. The long-pass filter may, for example, be configured only to transmit light at wavelengths outside the visible part of the supercontinuum spectrum, thereby avoiding all visible light.

In an embodiment, the optical filter comprises a notch filter arranged to remove light at one or more specific wavelengths within the supercontinuum.

Figure 4:
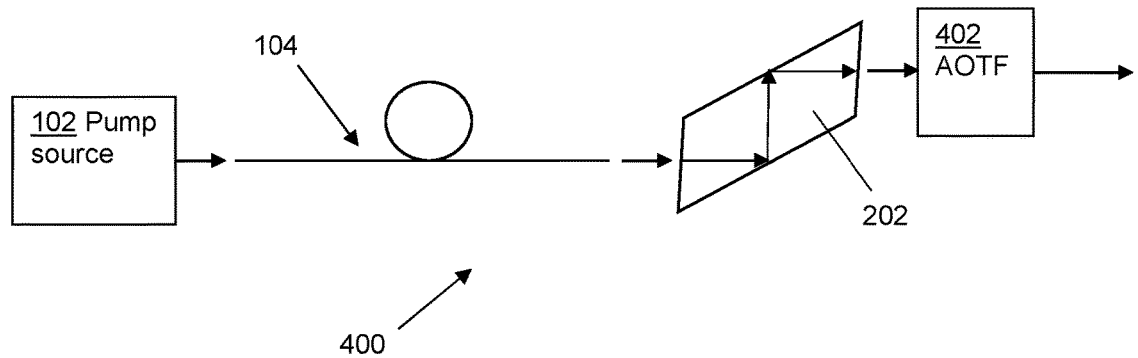

In an embodiment, shown in FIG. 4, the optical source 400 comprises an optical filter in the form of an acousto-optic tunable filter, AOTF 402.

The AOTF is arranged to transmit the linearly polarised supercontinuum light at wavelengths within a selected range within the bandwidth of the supercontinuum light. The AOTF is tunable, so the selected range that is transmitted can be tuned across the bandwidth of the supercontinuum light, meaning that the optical source 400 is configurable to output linearly polarized light at a selected band of wavelengths within the supercontinuum bandwidth.

A single AOTF 402 may be used since the supercontinuum light output from the wideband quarter-wave retarder is linearly polarised in a single polarisation.

Corresponding embodiments and advantages apply equally to corresponding to features of the supercontinuum light generation apparatus described below.

Figure 5:
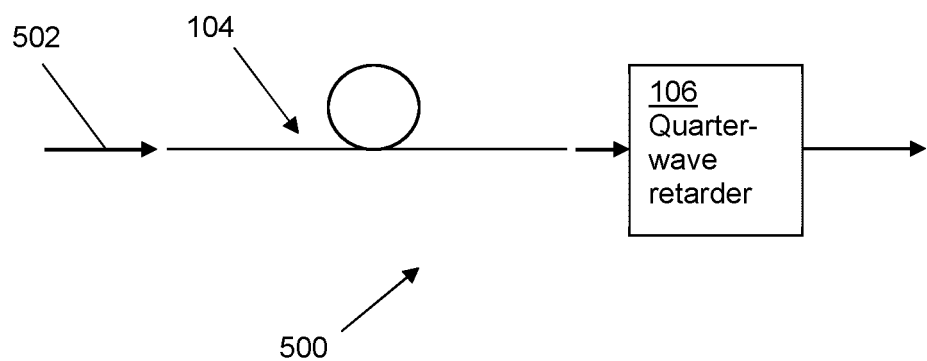
FIGS. 5 to 8 are block diagrams illustrating embodiments of supercontinuum generation apparatus.

Referring to FIG. 5, illustrating the components 500 downstream of the pump light source of an embodiment comprising a twisted photonic crystal fibre, PCF, 104 and a wideband quarter-wave retarder 106.

The twisted PCF is arranged to receive the circularly polarised pump light 502 and to convert it into circularly polarised supercontinuum light.

The wideband quarter-wave retarder is arranged to convert the circularly polarised supercontinuum light into linearly polarised supercontinuum light. The wideband quarter-wave retarder is configured to introduce a 90° phase shift in one of the two perpendicular polarization components of the received circularly polarized light, thereby bringing the two polarization components into phase, in a chosen linear polarisation state.

Figure 6:
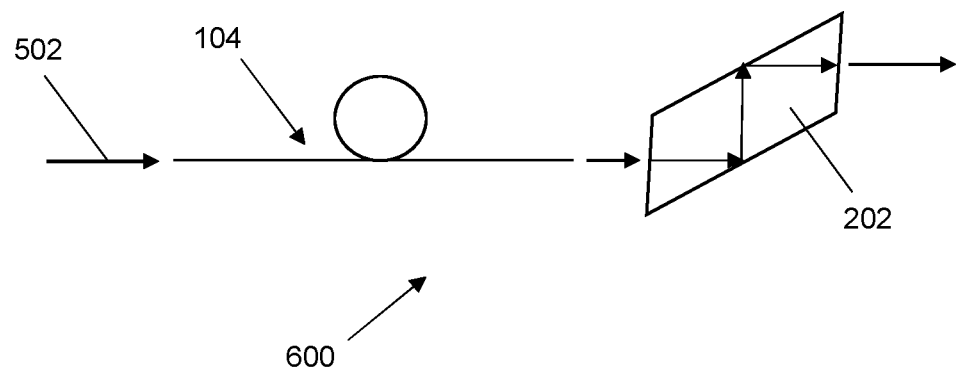

Referring to FIG. 6, illustrating the components 600 downstream of the pump light source of an embodiment in which the wideband quarter-wave retarder is a Fresnel rhomb 202 optical prism. The Fresnel rhomb advantageously has an operating bandwidth that encompasses the full spectrum of the circularly polarized supercontinuum light, so that all wavelengths within the supercontinuum are converted from circular to linear polarization.

The Fresnel rhomb is arranged such that the received circularly polarized light undergoes two total internal reflections on transmission through the Fresnel rhomb. The Fresnel rhomb is configured such that each reflection introduces a 45° phase shift in one of the two perpendicular polarization components of the received circularly polarized light. Transmission through the Fresnel rhomb therefore introduces a 90° phase shift in the selected polarization component, thereby bringing the two polarization components into phase so that the output supercontinuum light is linearly polarized at 45° to the plane of incidence and reflection of the light within the Fresnel rhomb.

Figure 7:
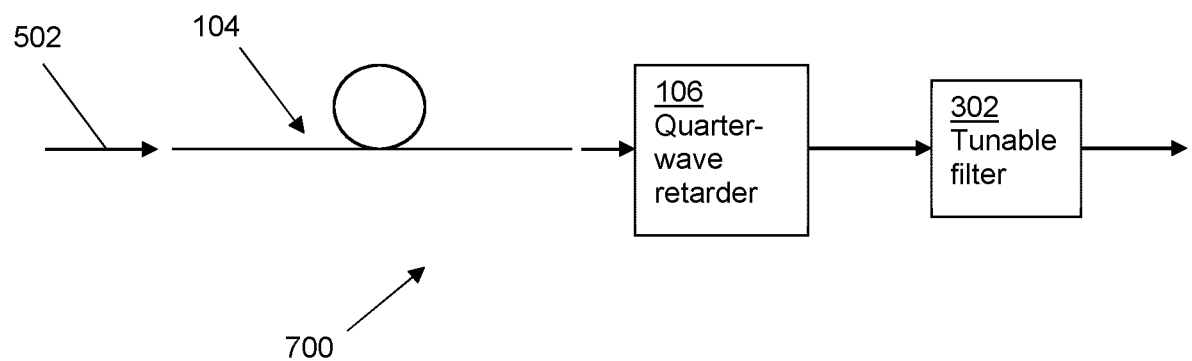

In an embodiment, shown in FIG. 7, the components 700 of the optical source additionally comprises a wavelength tunable bandpass optical filter 302. The wavelength tunable bandpass optical filter 302 is arranged to transmit the linearly polarised supercontinuum light at wavelengths within a selected range. The pass band of the filter 302 is tunable across the bandwidth of the supercontinuum. The optical source 300 is therefore configurable to output linearly polarized light at any selected band of wavelengths within the supercontinuum bandwidth.

Figure 8:
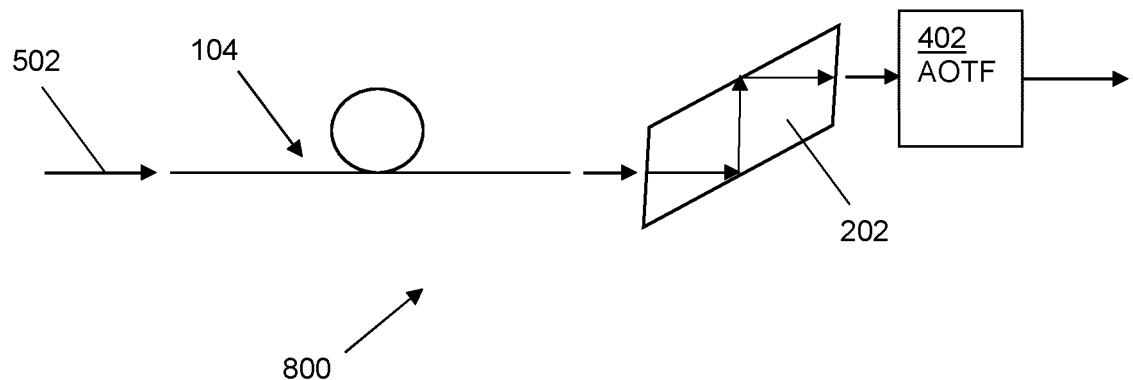

Referring to FIG. 8, illustrating the components 800 downstream of the pump light source in an embodiment in which the wavelength tunable bandpass optical filter is an AOTF 402. Pulses 502 from the pump light source are received by the twisted photonic crystal fibre, PCF, 104 to generate the circular polarized supercontinuum light which subsequently is converted to linear polarized supercontinuum light by the Fresnel rhomb 202. The AOTF is arranged to transmit the linearly polarised supercontinuum light at wavelengths within a selected range. The AOTF is configured to transmit a narrow bandwidth within the bandwidth of the supercontinuum light. The AOTF is tunable, so the narrow bandwidth that is transmitted can be tuned across the bandwidth of the supercontinuum light, meaning that the optical source is configurable to output linearly polarized light at any selected band of wavelengths within the supercontinuum bandwidth.

Items

1. A Supercontinuum light generation apparatus comprising:
   a pump light source arranged to provide circularly polarised pump light;
   a twisted photonic crystal fibre arranged to receive circularly polarised pump light and to convert the pump light into circularly polarised supercontinuum light; and
   a wideband quarter-wave retarder arranged to convert the circularly polarised supercontinuum light into linearly polarised supercontinuum light.
2. Supercontinuum light generation apparatus according to item 1, wherein the wideband quarter-wave retarder is a Fresnel rhomb (202).
3. Supercontinuum light generation apparatus according to item 1 or item 2, wherein the twisted PCF is a solid core twisted PCF.
4. Supercontinuum light generation apparatus according to item 3, further comprising a tunable bandpass optical filter arranged to transmit the linearly polarised supercontinuum light at wavelengths within a selected range.
5. Supercontinuum light generation apparatus according to item 4, wherein the tunable bandpass optical filter is an acousto-optic tunable filter.

The invention claimed is:

1. A supercontinuum light generation apparatus, comprising:
   a pump light source configured to provide circularly polarised pump light;
   a twisted photonic crystal fibre (PCF) arranged to receive the circularly polarised pump light and to convert the pump light into circularly polarised supercontinuum light; and
   a wideband quarter-wave retarder arranged to convert the circularly polarised supercontinuum light into linearly polarised supercontinuum light.

2. The supercontinuum light generation apparatus of claim 1, wherein the wideband quarter-wave retarder comprises a Fresnel rhomb.

3. The supercontinuum light generation apparatus of claim 1, wherein the twisted PCF is a solid core twisted PCF.

4. The supercontinuum light generation apparatus of claim 1, comprising an optical filter arranged to transmit the linearly polarised supercontinuum light at wavelengths within a selected range.

5. The supercontinuum light generation apparatus of claim 4, wherein the optical filter comprises one or more of a bandpass filter, a short-pass filter, a long-pass filter, and a notch filter.

6. The supercontinuum light generation apparatus of claim 4, wherein the optical filter is a tunable optical filter.

7. The supercontinuum light generation apparatus of claim 6, wherein the tunable optical filter is an acousto-optic tunable filter.

8. The supercontinuum light generation apparatus of claim 4, wherein the optical filter comprises one or more polarization-dependent filters.

9. The supercontinuum light generation apparatus of claim 4, the twisted PCF has a twist rate greater than 1 rad/cm, greater than 10 rad/cm or greater than 100 rad/cm.

10. The supercontinuum light generation apparatus of claim 4, the twisted PCF has a twist rate greater than 10 rad/cm.

11. The supercontinuum light generation apparatus of claim 4, the twisted PCF has a twist rate greater than 100 rad/cm.

\* \* \* \* \*